Oct. 21, 1924.

Re. 15,934

H. J. MASTENBROOK

AUTOMOBILE DOOR HINGE

Original Filed Dec. 10, 1919

INVENTOR.
Henry J. Mastenbrook
BY
Parker & Burton
ATTORNEY.

Reissued Oct. 21, 1924. Re. 15,934

UNITED STATES PATENT OFFICE.

HENRY J. MASTENBROOK, OF LAKEWOOD, OHIO, ASSIGNOR TO PARSONS MANUFACTURING COMPANY, OF DETROIT, MICHIGAN, A CORPORATION OF MICHIGAN.

AUTOMOBILE DOOR HINGE.

Original No. 1,427,308, dated August 29, 1922, Serial No. 343,833, filed December 10, 1919. Application for reissue filed January 25, 1924. Serial No. 688,623.

*To all whom it may concern:*

Be it known that I, HENRY J. MASTENBROOK, a citizen of the United States, residing at Lakewood, county of Cuyahoga, and State of Ohio, have invented a certain new and useful Improvement in Automobile Door Hinges, and declare the following to be a full, clear, and exact description of the same, such as will enable others skilled in the art to which it pertains to make and use the same, reference being had to the accompanying drawings, which form a part of this specification.

This invention relates to an improved automobile door hinge.

It is essential in hinges of this class that the joints and cracks between the interengaging parts of the opposed plates be concealed so far as possible for the reason that, notwithstanding how thoroughly and effectually the hinges are painted, enameled, or otherwise coated, the coating about these working parts becomes cracked or worn away exposing the metal to water and moisture and resulting in its rusting, the rust accumulating about the joints or cracks and running down the side of the hinge and presenting an unsightly appearance. The concealment of the joints and cracks has been comparatively easy in cast metal hinges for the hinges could be moulded in a shape accomplishing this end, but cast hinges are expensive, unduly heavy, and more or less easily broken.

It is the purpose of this invention to provide an automobile door hinge possessing the foregoing essential feature and to construct the same of sheet metal thereby rendering it cheap, convenient of manufacture, light and strong, and to design it so that the pintle may be readily removed to expedite detachment of the door.

I am aware that automobile door hinges have been made of sheet metal, but none has been produced of the type to which this invention relates wherein the cracks and joints between the hinge plates have been concealed.

A hinge possessing the advantages above set forth and constructed in accordance with my invention is illustrated in the drawing accompanying and forming a part hereof and wherein.

Figure 3:
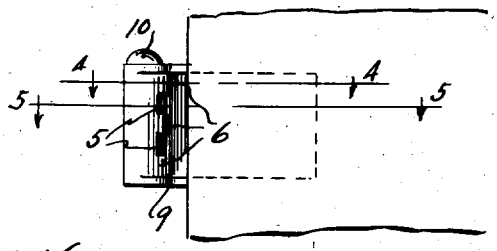
Fig. 3 is an elevation of the hinge as viewed from the rear, or from the right of Fig. 1.
Figure 4:
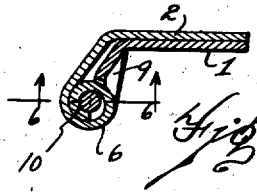
Figure 5:
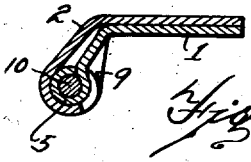

Figs. 4 and 5 are horizontal sections on the respective lines 4—4 and 5—5 of Fig. 3.

Figure 6:
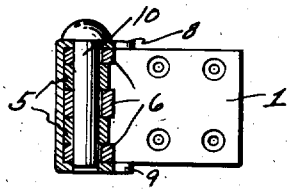

Fig. 6 is a section on the correspondingly numbered line of Fig. 4.

Figure 1:
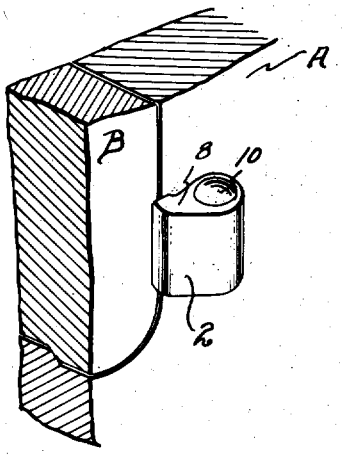
Figure 1 is a perspective view of the hinge applied to an automobile, adjacent parts of the door and body being shown.
Figure 2:
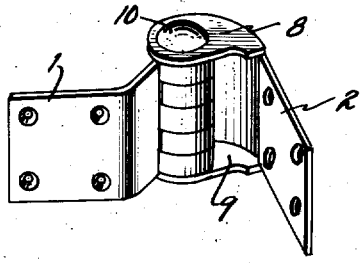
Fig. 2 is a similar view of the hinge as it appears from the inside with the plates spread apart.

For convenience of description I shall refer to the opposed hinge plates as the inner plate 1 and the outer plate 2, the former being designed for attachment to the pillar of the body A, and the latter to the adjacent frame member of the door B. When the door is closed, the body portions of the plates 1 and 2 lie flat against each other, as shown in Figs. 4 and 5, and their outer ends are turned laterally in a direction away from the door in accordance with the usual construction of hinges of this type. The outer end of the inner plate terminates in tongues, two being shown in the present instance that are shaped to form pintle encircling knuckles 5, as best illustrated in Fig. 5. The corresponding end of the outer plate 2 is wrapped about the knuckles 5 for a considerable part of their circumference, terminating therebeyond in three tongues that are shaped to form knuckles 6, one being disposed between the knuckles 5 of the former plate and the two others above and below the former knuckles, as shown in Figs. 2, 3 and 6.

To improve the appearance of the hinge, I may provide top and bottom plates 8 and 9, respectively, which are preferably integral parts of the outer plate 2 and which conceal the outer end of the inner plate when the parts are in closed condition. The plates 8 and 9 have apertures in axial alignment with the knuckles 5 and 6 and a pintle 10 extends through these apertures and the knuckles to connect the plates in the usual manner. The withdrawal of the pintle may be initiated by driving a suitable instrument up through the aperture of the bottom plate 9 when it is desired to remove the door.

From this description it will be seen that my invention provides a hinge of simple construction, one that is cheap, attractive of appearance, and wherein the joints and cracks between the interengaging parts of the opposed plates are effectually concealed from view when the hinge is applied to an automobile and viewed from usual angles. The distance to which the unbroken surface of the outer plate extends about the joint between the plates is indicated in Fig. 5.

What I claim is:

1. A hinge of the class described comprising opposed plates, one terminating at one end in a series of knuckles, and the other having its end portion extended about and partially concealing said knuckles and terminating in knuckles interengaging those of the former plate, the latter plate having parts turned at right angles to its body portion over the end knuckles, said parts having apertures in axial alignment with the knuckles, and a pintle extending through the apertures and knuckles.

2. A hinge of the class described comprising an inner and an outer plate, the outer end portion of the latter plate being turned about a given axis through a number of degrees and terminating therebeyond in knuckles that are concealed by such portion, the inner plate terminating in knuckles interengaging with those of the former plate, top and bottom plates carried by the outer end of one of the former plates and between which the corresponding portion of the other plate is adapted to repose when the hinge is in closed condition, said plates having apertures in axial alignment with the knuckles of the plates, and a pintle extending through said apertures and knuckles.

3. An automobile door hinge comprising a pair of sheet metal plates, one terminating at one end in a series of knuckles, the corresponding end of the other plate extending about and concealing the knuckles of the first plate and itself terminating in a series of knuckles disposed between those of the first plate and being in endwise engagement therewith and having an internal diameter substantially equal to the internal diameter of the knuckles of the first plate, and a pintle extending through the knuckles of the two plates.

4. In a hinge, a body member having its outer end portion provided with a longitudinal channel and a hood closing the outer end of said channel, and a complementary member having a hinge pin connection with the outer end of said body member and adapted at its outer end portion to fit within said channel, said hood partially inclosing and concealing the hinged end of said complementary member.

5. In a hinge, a body member having its outer end portion provided with a longitudinal channel and a hood closing the outer end of said channel, and a complementary member having a hinge pin connection with the outer end of said body member and adapted at its outer end portion to fit within said channel, said hood partially inclosing and concealing the hinged end of said complementary member and adapted to form a stop to limit the movement of the complementary member in one direction.

In testimony whereof I hereunto affix my signature.

HENRY J. MASTENBROOK.